(12) United States Patent
Ferraiolo

(10) Patent No.: US 8,979,428 B2
(45) Date of Patent: Mar. 17, 2015

(54) LIGHTWEIGHT PROTECTION ELEMENT AND FILTER OF THE MATTRESS TYPE

(71) Applicant: Francesco Ferraiolo, Ca' de' Fabbri (Bologna) (IT)

(72) Inventor: Francesco Ferraiolo, Ca' de' Fabbri (Bologna) (IT)

(73) Assignee: Officine Maccaferri S.p.A., Bologna (IT)

( * ) Notice: Subject to any disclaimer, the term of this patent is extended or adjusted under 35 U.S.C. 154(b) by 0 days.

(21) Appl. No.: 14/307,080

(22) Filed: Jun. 17, 2014

(65) Prior Publication Data

US 2014/0291229 A1 Oct. 2, 2014

Related U.S. Application Data

(63) Continuation of application No. 13/721,456, filed on Dec. 20, 2012, now abandoned, which is a continuation of application No. 13/471,849, filed on May 15, 2012, now abandoned, which is a continuation of application No. 12/928,921, filed on Dec. 22, 2010, now abandoned, which is a continuation of application No. 11/921,068, filed as application No. PCT/IB2006/001467 on May 24, 2006, now abandoned.

(30) Foreign Application Priority Data

May 26, 2005 (IT) .............................. BO2005A0363

(51) Int. Cl.
*E02B 3/12* (2006.01)
*B01D 35/02* (2006.01)
*E02D 31/06* (2006.01)
*B32B 7/08* (2006.01)

(52) U.S. Cl.
CPC ................ *B01D 35/02* (2013.01); *E02B 3/127* (2013.01); *E02B 3/12* (2013.01); *E02D 31/06* (2013.01); *B32B 7/08* (2013.01)
USPC .......................................................... 405/19

(58) Field of Classification Search
USPC ...................... 405/15–19, 302.4, 302.6, 302.7
See application file for complete search history.

(56) References Cited

U.S. PATENT DOCUMENTS

| 984,121 A | 2/1911 | Condie |
|---|---|---|
| 2,201,279 A | 5/1940 | Willing |

(Continued)

FOREIGN PATENT DOCUMENTS

| DE | 3532640 A1 | 4/1986 |
|---|---|---|
| DE | 37 28 255 A1 | 3/1989 |

(Continued)

OTHER PUBLICATIONS

Machine translation of DE4408651 document Dec. 12, 2013, 5 pages.

(Continued)

*Primary Examiner* — Sunil Singh
(74) *Attorney, Agent, or Firm* — Flynn, Thiel, Boutell & Tanis, P.C.

(57) ABSTRACT

A lightweight protection element and filter of the mattress type comprises an external containment structure (10, 20), a three-dimensional internal structure (30) with a high cavity index and a granular filler material which is inserted inside the containment structure. Engagement means (50, 52) of the mechanical type are distributed over the external containment structure in order to engage predetermined portions of those structure with each other.

11 Claims, 1 Drawing Sheet

(56) References Cited

U.S. PATENT DOCUMENTS

| | | |
|---|---|---|
| 3,928,696 A | 12/1975 | Wandel et al. |
| 4,181,450 A | 1/1980 | Rasen et al. |
| 5,257,878 A | 11/1993 | Peterson |
| 5,421,123 A * | 6/1995 | Sakate et al. ............ 47/56 |

FOREIGN PATENT DOCUMENTS

| | | |
|---|---|---|
| DE | 4408651 A1 | 9/1995 |
| EP | 0 030 452 A1 | 6/1981 |
| EP | 0 598 999 A1 | 6/1994 |
| GB | 1 487 986 | 10/1977 |
| JP | 49-048308 A | 5/1974 |
| JP | 63-165329 A | 7/1988 |
| JP | 7-238530 A | 9/1995 |
| JP | 8-4014 A | 1/1996 |
| JP | 8-74161 A | 3/1996 |
| JP | 10-252087 A | 9/1998 |
| JP | 11-172666 A | 6/1999 |
| JP | 2001-86857 A | 4/2001 |
| JP | 2003-278130 A | 10/2003 |
| JP | 2005-54529 | 3/2005 |
| RU | 2044813 C1 | 9/1995 |
| WO | WO 95/24531 | 9/1995 |

OTHER PUBLICATIONS

Invitation to Respond to Written Opinion dated May 10, 2012 and Written Opinion of Singapore Patent Office dated May 9, 2012 (11 pages).

Search Report of Singapore Patent Office dated May 9, 2012 (7 pages).

Form PCT/ISA/210 International Search Report dated Aug. 29, 2006 (3 pages).

English translation of Office Action dated May 31, 2011 issued by the Japanese Patent Office in Japanese Application No. 2008-512948 (6 pages).

Office Action issued in Application No. 2007148915 by the Russian Patent Office dated May 31, 2011 with English translation (8 pages).

* cited by examiner

LIGHTWEIGHT PROTECTION ELEMENT AND FILTER OF THE MATTRESS TYPE

CROSS REFERENCE TO RELATED APPLICATIONS

This application is a continuation of prior U.S. application Ser. No. 13/721,456, which was filed on Dec. 20, 2012, which is a continuation of prior U.S. application Ser. No. 13/471,849, which was filed on May 15, 2012, which is a continuation of U.S. application Ser. No. 12/928,921, which was filed on Dec. 22, 2010, which is a continuation of prior U.S. application Ser. No. 11/921,068, which was filed Nov. 26, 2007, and which was the National Stage of International Application No. PCT/IB2006/001467, filed May 24, 2006.

FIELD OF THE INVENTION

The present invention relates to a lightweight protection element and filter of the mattress type, and in particular, though in a non-limiting manner, to a ballasted filtering mattress for protecting and covering terrain, more preferably a seabed.

BACKGROUND OF THE INVENTION

It is known from various documents, also including some from the same Applicant, to use flexible protection elements of parallelepipedal form in order to immobilize and protect, for example, underwater pipes, canal banks and beds. Those elements comprise a flexible external cover which coats a gabion which is constructed from metal material and is filled with a mixture composed of bitumen, sand and stones or pebbles, so as to obtain elements having a high unit weight. Those protection elements, once made up, must be lowered into water by means of handling machines, such as cranes, mechanical arms, and the like. In order to facilitate the above-mentioned laying, operations are known for producing mattress type protection elements comprising support elements which facilitate, when in use, the handling thereof.

One of the main limitations of the elements of known type is constituted by their great thickness and their heaviness, which make the installation operations extremely complex and troublesome.

Another limitation of the elements of known type is constituted by their limited overall dimensions, which are linked to the dimensions of the gabions and/or the forms which are used for constructing them.

An object of the present invention is to provide a protection element and filter of the mattress type which has significantly reduced weight, which allows easier installation, which has overall dimensions which are variable in accordance with the type of application necessary and which can successfully constitute protection elements and a filter without longitudinal discontinuities, for example, but in a non-limiting manner, up to 200 linear meters.

Another object of the present invention is to provide a protection element and filter which is economical, easy and rapid to construct and which therefore allows a substantial saving in terms of the time and cost of installation.

In order to achieve the above-mentioned objects, the present invention relates to a lightweight protection element and filter of the mattress type as described below.

One of the main advantages of the present invention is constituted in that the protection element further comprises a three-dimensional internal structure with a high cavity index, in which filler material is inserted, such as gravel, silt, finely crushed stone, or any other natural granular element which is available in situ. That advantageous feature avoids the need to create internal diaphragm openings for stabilizing the filler material.

According to another particularly advantageous feature, the mattress type element also comprises a double layer of geotextile material, for example, an upper layer and a lower layer, which, being connected to the three-dimensional internal structure, allow the protection element to act as a filtering element and, at the same time, to remain fitted closely against the terrain to which it is applied owing to the ballast weight of the granular filler material.

BRIEF DESCRIPTION OF THE DRAWINGS

Further features and advantages will be appreciated from the following description of one of the preferred embodiments, with reference to the appended drawings, given purely by way of non-limiting example, in which.

DETAILED DESCRIPTION

Figure 1:
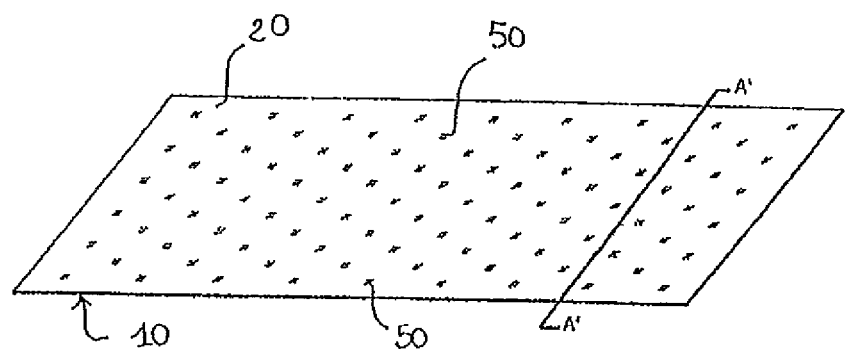
FIG. 1 is a schematic perspective view of a lightweight protection element and filter of the mattress type according to the present invention.
Figure 2:
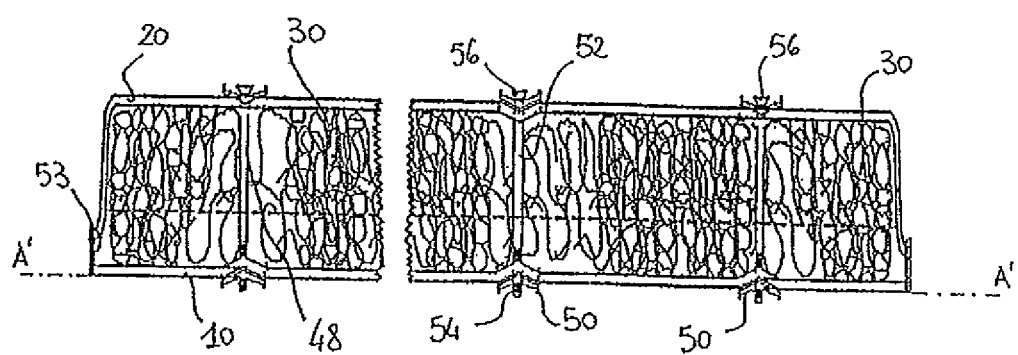
FIG. 2 is a schematic sectioned view along line A'-A' of the element illustrated in FIG. 1.

With reference now to the Figures, a lightweight protection element and filter of the mattress type according to the present invention comprises an external containment structure. The external containment structure comprises a lower portion, for example, a bottom sheet 10, and an upper portion, for example, a cover sheet 20. Both the sheets 10 and 20 can be constructed from synthetic material, preferably geosynthetic material, for example, woven geotextiles or woven geogrilles, geomembranes, geonets. Alternatively, the sheets 10 and 20 can be constructed from natural material, preferably a biomat and/or a biodegradable bionet, for example, of straw, coconut fibre or wood shavings, and generally natural fibres.

Preferably, a reinforcement element 48, for example, a metal net and/or a geogrille, can be engaged with the bottom sheet 10 so as to increase the resistance to traction of the whole mattress.

Between the lower portion 10 and the upper portion 20, there is arranged a three-dimensional internal structure 30 with a high cavity index, preferably a non-woven geotextile, even more preferably a three-dimensional structure comprising monofilaments of heat-sensitive material, for example, synthetic polymers and/or polyamides. In accordance with a particular embodiment of the present invention, the monofilaments of heat-sensitive material can be extruded onto the reinforcing metal net and/or geogrille 48.

Granular filler material, for example, gravel, sand, silt, finely crushed stone or any other natural element which is preferably available in situ, is inserted inside the three-dimensional internal structure 30 with a high cavity index. The granular filler material serves as an auxiliary in the filtering action of the three-dimensional draining structure 30, to maintain the thickness of the three-dimensional geosynthetic even under great loads and to weigh down the whole lightweight protection element and filter.

The bottom sheet 10 and the cover sheet 20 are engaged with each other by way of engagement means, preferably of the mechanical type, for example, but in a non-limiting manner, a pair of plates 50, or continuous strips, constructed from synthetic and/or metal materials. The plates 50 are arranged, in an aligned, opposing state, on the external surfaces of the bottom sheet 10 and the cover sheet 20 and distributed over the surfaces in the region of respective openings formed in the surfaces of the two sheets 10 and 20. Each plate 50 comprises a through-hole, inside which there is passed a fixing bar 52 with a thread 54, scarfed in the plate 50 or lower strip. Two blocks 56 are screwed to the ends 54 of the bar 52 so as to secure the position of the two plates 50 along the bar 52 and to engage the bottom sheet 10 and the cover sheet 20 with each other.

Naturally, a person skilled in the art could develop, without any inventive step, different engagement means, mechanical or non-mechanical, with respect to those described above without thereby departing from the scope of the present invention.

As is clearly visible in FIG. 1, the engagement means are distributed uniformly over the entire extent of the bottom sheet 10 and cover sheet 20 so as to bring about through-fastening of the protection element and filter. The ends of the sheets 10 and 20 are fixed to each other, for example, by means of continuous seams 53 so as to close the protection element and filter and retain inside it the three-dimensional structure with a high cavity index and the filler material.

In accordance with another of the preferred embodiments of the present invention, the external containment structure of the protection element and filter comprises, for example, but in a non-limiting manner, a pouch or a container of synthetic or natural material, as described above, which is open at one side and inside which there is inserted the three-dimensional structure with a high cavity index and the filler material. Similarly, the open ends of the external structure are fixed to each other, for example, by means of continuous seams 53 so as to close the protection element and filter and retain inside it the three-dimensional internal structure and the filler material.

In accordance with another of the embodiments of the present invention, the filler material may comprise fertile soil, seeds and/or other similar material, should the sheets 10 and 20 have been constructed from geosynthetic materials of natural fibres. The lightweight protection element and filter can thereby be used for covering terrain, embankments and inclinations which have to be renewed.

The embodiments of the invention may change in accordance with the various dimensions and pieces of equipment of the finished mattresses. In particular, for finished mattresses of great linear extent, generally over from 6 to 7 meters in length, there can be used pontoons or rollers on which the elements roll, whilst for single shorter mattresses there can be used lifting frames of various forms and dimensions. In that last case, the fixing bars 52 can be provided with engagement means, for example, end ring bolts, so as to be able to allow them to be connected to the lifting frame during the installation operations.

Naturally, the principles of the invention remaining the same, the forms of embodiment and details of construction may vary widely with respect to those described and illustrated without thereby departing from the scope of the invention.

The invention claimed is:

1. A lightweight filtering mattress for protecting and covering terrains, comprising an external containment structure having one or more sheets of material which define an internal space; a three-dimensional internal structure with a high cavity index comprised of non-woven geotextile disposed throughout the internal space; a granular filler material inside the three-dimensional internal structure, the granular filler material disposed to assist the three-dimensional internal structure in the filtering action and to maintain the thickness of the three-dimensional internal structure under load; and engagement means distributed over the external containment structure in order to engage predetermined portions of the external containment structure with each other.

2. The mattress according to claim 1, wherein the external containment structure comprises a lower portion and an upper portion, the engagement means engaging the lower portion with the upper portion.

3. The mattress according to claim 2, wherein the engagement means comprises mechanical engagement means.

4. The mattress according to claim 3, wherein the mechanical engagement means comprises at least a pair of plates, at least one fixing bar, and at least a pair of blocks which can selectively be engaged with ends of the fixing bar.

5. The mattress according to claim 4, wherein the external containment structure has ends which are fixed to each other so as to close the mattress, and to retain the three-dimensional internal structure with a high cavity index and the filler material.

6. The mattress according to claim 2, wherein the lower portion and the upper portion of the external containment structure are constructed from at least one of the following synthetic materials: woven geotextiles, woven geogrilles, geomembranes, geonets.

7. The mattress according to claim 2, wherein the lower portion and the upper portion of the external containment structure are constructed from at least one of the following natural materials: reed matting, biodegradable bionet, straw, coconut fibre, wood shavings.

8. The mattress according to claim 1, wherein the three-dimensional internal structure with a high cavity index comprises monofilaments of heat-sensitive material.

9. The mattress according to claim 1, and further comprising a reinforcement element in order to increase, during use, the resistance to traction of the mattress.

10. A lightweight protection element comprising:
a containment structure comprising a bottom sheet and an upper portion disposed above the bottom sheet, the bottom sheet and upper portion being disposed to define a space therebetween, the bottom sheet and the upper portion being constructed from at least one of the following synthetic materials: woven geotextiles, woven geogrilles, geomembranes, and geonets;
a plurality of engagers each comprising members on the bottom sheet and upper portion and engaging predetermined portions of the containment structure with each other;
a three-dimensional internal structure with a high cavity index disposed throughout the space in the containment structure and comprising monofilaments of heat-sensitive material distributed throughout the space within the containment structure, wherein the engagers are distributed over the entire extent of the bottom sheet and upper portion and extend through the three-dimensional internal structure between the bottom sheet and the upper portion so as to fix same to each other and stabilize the element; and
granular filler material in the space within the containment structure,
wherein ends of the bottom sheet and the upper portion are fixed to each other so as to close the element and retain inside it the three-dimensional structure.

11. The element according to claim 10, wherein each engager comprises two opposing plates, a fixing bar attached to the plates and having a first end and a second end, and a first block attached to the first end of the fixing bar and a second block attached to the second end of the fixing bar.

* * * * *